United States Patent
Harnois

(10) Patent No.: US 8,166,352 B2
(45) Date of Patent: Apr. 24, 2012

(54) ALARM CORRELATION SYSTEM

(75) Inventor: Pascal Harnois, Ottawa (CA)

(73) Assignee: Alcatel Lucent, Paris (FR)

( * ) Notice: Subject to any disclaimer, the term of this patent is extended or adjusted under 35 U.S.C. 154(b) by 232 days.

(21) Appl. No.: 12/495,345

(22) Filed: Jun. 30, 2009

(65) Prior Publication Data

US 2010/0332918 A1 Dec. 30, 2010

(51) Int. Cl.
*G06F 11/00* (2006.01)

(52) U.S. Cl. ............................................ 714/57; 714/25

(58) Field of Classification Search .................. 714/25, 714/57
See application file for complete search history.

(56) References Cited

U.S. PATENT DOCUMENTS

| | | | | |
|---|---|---|---|---|
| 5,309,448 A | * | 5/1994 | Bouloutas et al. | 714/25 |
| 6,604,208 B1 | * | 8/2003 | Gosselin et al. | 714/4.12 |
| 6,701,459 B2 | * | 3/2004 | Ramanathan et al. | 714/37 |
| 6,707,795 B1 | * | 3/2004 | Noorhosseini et al. | 370/242 |
| 6,862,698 B1 | * | 3/2005 | Shyu | 714/57 |
| 7,107,496 B1 | * | 9/2006 | D'Ippolito et al. | 714/46 |
| 7,131,037 B1 | * | 10/2006 | LeFaive et al. | 714/46 |
| 7,257,744 B2 | * | 8/2007 | Sabet et al. | 714/56 |
| 2010/0156623 A1 | * | 6/2010 | Qian et al. | 340/517 |
| 2010/0157812 A1 | * | 6/2010 | Blocker et al. | 370/242 |

* cited by examiner

*Primary Examiner* — Philip Guyton
(74) *Attorney, Agent, or Firm* — Kramer & Amado P.C.

(57) ABSTRACT

An alarm correlation method with rules and model is disclosed for suppression of alarms which will clear when another alarm clears. The alarm correlation method with rules and model includes a list of objects which alarms may be raised, and a list of correlation rules for each of the objects which associates objects which have correlated alarms, and a method of traversing the lists so that correlated alarms may be suppressed. The alarm correlation method with rules and model is particularly useful for overcoming operator overload due to the presence of multiple correlated alarms.

20 Claims, 4 Drawing Sheets

ALARM CORRELATION SYSTEM

FIELD OF THE INVENTION

The invention relates to generally to alarm correlation in communication networks and is particularly concerned with suppression of correlated alarms so as to simplify alarm cause analysis.

BACKGROUND OF THE INVENTION

The increasing processing power of telecommunications equipment has resulted in an increased volume of data traffic concentrated per unit of equipment. As well, increased equipment density due to enhanced ASICs is resulting in more lines per card, more cards per shelf, and even more shelves per equipment bay.

Functionality of equipment is provided by both hardware circuitry and software functions. Failures can occur in either of these elements. As well, failures of operation can occur due to faults within the equipment or due to circumstances exterior to the equipment. For example, a component on a circuit board may fail, or an optical fiber may be severed in the field.

Upon detection of a failure of operation or fault, telecommunications equipment normally produces a short message, known as an alarm message, which indicates that it is experiencing some condition or abnormality. Typically, the alarm message will contain information about the device issuing the alarm, the time of the message, and some description of the abnormal operation. Alarm messages may be considered symptoms of faults and a single fault may result in a large number of alarms.

Operational problems in networks can be difficult and time consuming to debug because a problem in one place affects many other network objects, and many alarms are raised at the same time In the presence of alarms, it is necessary to trace the relationship between the alarms to understand what alarm may be signaling the root cause and which alarms are a consequence of failures entailed by the root cause.

Alarm association allows the operator to quickly:
Identify that a problem has occurred
Identify which network objects and services have been affected
Troubleshoot to find the objects closest to the cause Therefore, it would be desirable to have an error management display system capable of suppressing correlated alarms to simplify the presentation of alarm data for the operator.

SUMMARY OF THE INVENTION

It is an object of the invention to provide a method of alarm correlation.

According to an aspect of the invention there is provided a method for managing alarms arising on a plurality of objects in telecommunications equipment, the method comprising the steps of: establishing a list of networked alarm relations among the plurality of objects, wherein the list specifies correlated alarms and correlating alarms associations between the objects; establishing a list of correlating alarms; establishing a list of correlated alarms; and and upon a new alarm being raised on an object of the plurality of objects; traversing the list of networked alarm relations in conjunction with the list of correlating alarms and the list of correlated alarms; and assigning the new alarm to one of either the list of correlating alarms or the list of correlated alarms.

In some embodiments of the invention an object of the plurality of objects may be either a hardware device or a software function.

Advantageously, the traversing step includes traversing at least one of the set of parent objects, affecting objects, and children objects.

Further, advantageously the list of networked alarm relations among said plurality of objects further includes a priority attribute. The priority attribute may be used in the assigning step in the event that the new alarm can be correlated by two different alarms According to another aspect of the invention there is provided an article of manufacture for use in programming a telecommunications equipment to manage alarms arising on a plurality of objects in the telecommunications equipment, the article of manufacture comprising computer useable media accessible to the telecommunications equipment, wherein the computer useable media includes at least one computer program that is capable of causing the telecommunications equipment to perform the steps of: establishing a list of networked alarm relations among said plurality of objects, wherein said list specifies correlated alarms and correlating alarms associations between said objects; establishing a list of correlating alarms; establishing a list of correlated alarms; and and upon a new alarm being raised on an object of said plurality of objects; traversing said list of networked alarm relations in conjunction with said list of correlating alarms and said list of correlated alarms; and assigning said new alarm to one of either said list of correlating alarms or said list of correlated alarms.

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which.

DETAILED DESCRIPTION

Within the operational environment of telecommunications equipment an object may be defined as a hardware element or a software function. Alarms are raised on objects due to a failure of operation of the object, or due to a fault, for example a performance which is out of the required range of operation for that object.

Figure 1:
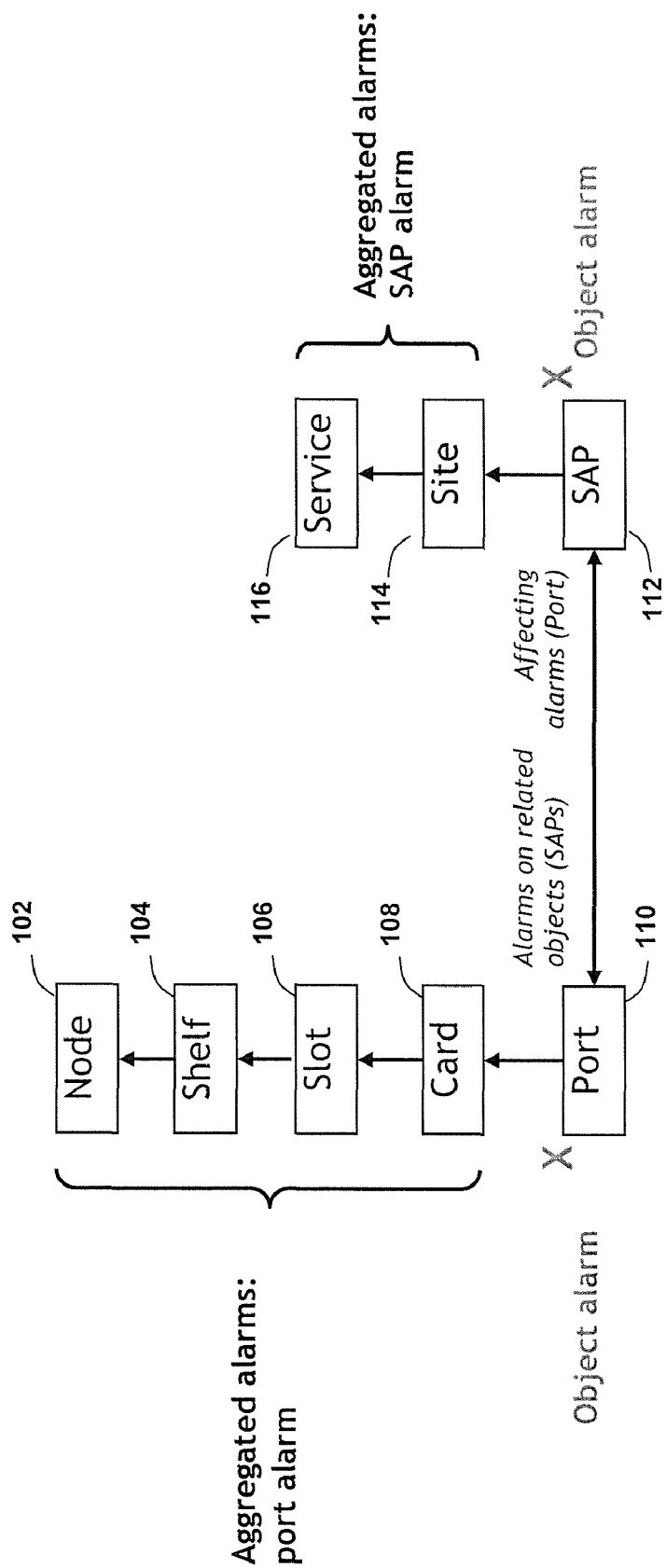
FIG. 1 illustrates a set of dependent objects.

Given objects may have other objects which are dependent in operation on the given objects. Referring to FIG. 1 there may be seen a set of dependent objects, some of which are hardware objects and others of which are software functions. The hardware objects include node 102, shelf 104, slot 106, card 108, and port 110. The software objects include Service Access Point (SAP) 112, site 114, and service 116. Due to the functional relation of the objects, faults on one of the objects will necessarily raise alarms on the dependent objects. For example a failure of node 102 will raise a node alarm, but will also raise a card 108 alarm, and potentially a slot 106 alarm, a shelf 104 alarm, and a port 110 alarm. Further, a failure of port 110 may raise a SAP 112 alarm.

From the viewpoint of the telecommunications equipment operator, it would be useful to see the alarms of importance. This facilitates and expedites troubleshooting of alarms.

For the purpose of understanding the operation of an embodiment of the invention, the following definition of a correlated alarm is used. A correlated alarm is defined as an alarm that will clear when another alarm, the correlating alarm, is cleared.

By way of example, if a port 110 fails due to a link being down, and there are 1000 SAPs on that port, the 1000 SAPs will each raise an alarm. The 1000 SAP alarms are correlated alarms, and the port 110 alarm is the correlating alarm. All these alarms appear in the operator's alarm display window, and make it difficult to notice that the primary alarm is the port. Alarm suppression hides the correlated alarms and shows only the correlating alarms. According to an embodiment of the invention, provisions are made to allow the operator to drill into the correlating alarm to see all the correlated alarms.

For the purposes of the following description, the correlation manager is the function which performs the alarm correlation and manages display suppression. The correlation manager is typically rendered in software, but in certain embodiments may be implemented in hardware or via Application Specific Integrated Circuits (ASICs).

Within the telecommunications equipment, alarms themselves are objects. To facilitate alarm suppression, alarm objects possess a correlating alarm field which indicates which alarm the current alarm is correlated under.

Figure 2:
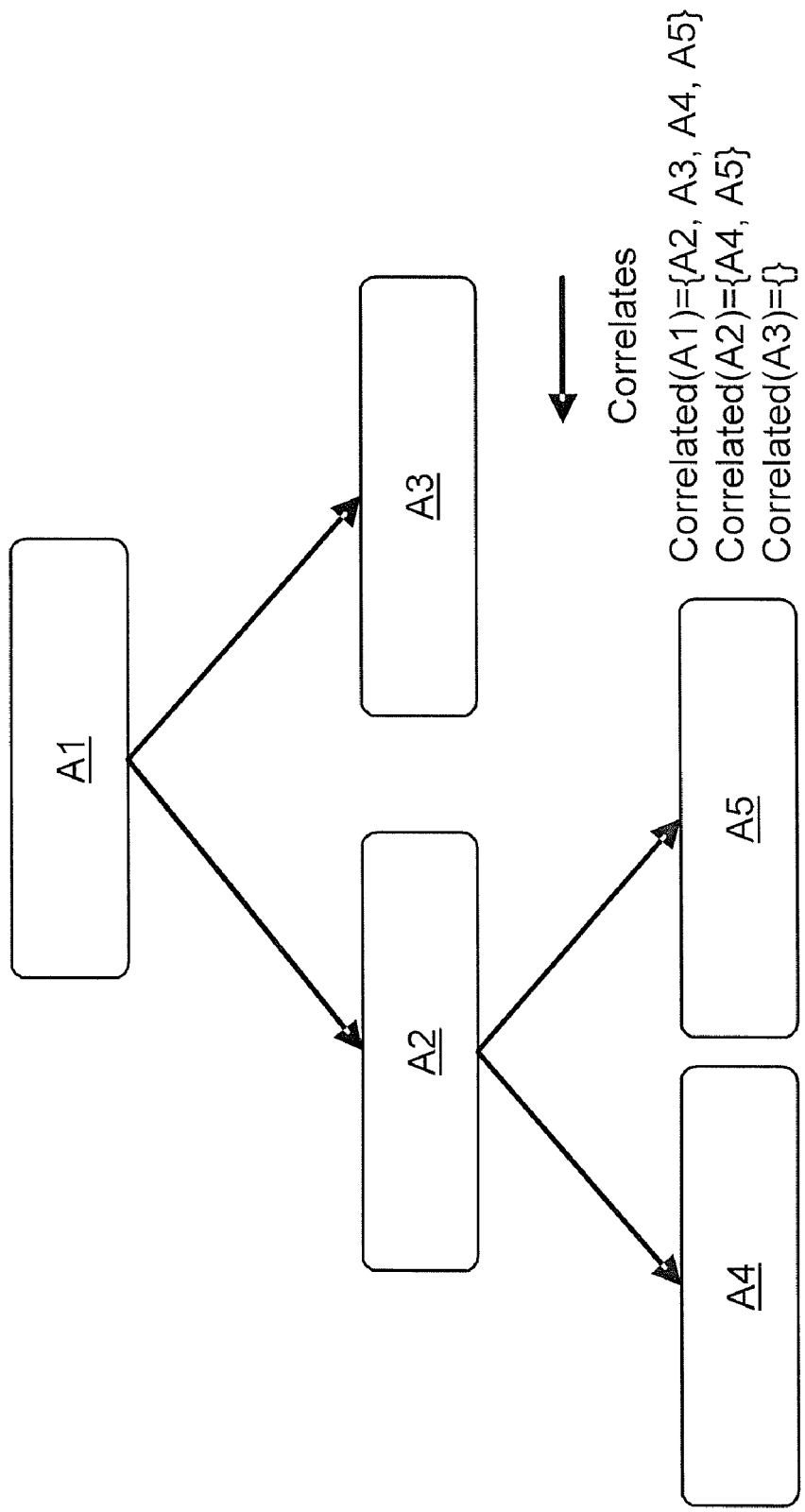
FIG. 2 illustrates a hierarchical depiction of a correlated alarms list in accordance with an embodiment of the present invention.

In order to correlate alarms efficiently, the correlation manager maintains the following structures:
    List of correlating alarms
    List of correlated alarms for each correlating alarm
    List of correlation rules To build the correlated alarm list for each alarm, the correlation manager performs a recursive traversal of all the alarms correlated under the specified alarm. Referring to FIG. 2 there may be seen a graphically depicted example of a correlation list illustrating the correlation dependencies of the alarms A1, A2, A3, A4, A5, and A6.

Correlation rules describe how alarms will be correlated. To do so, correlation rules have the following structure:
    A correlation tag will require a type attribute which will indicate whether this rule is correlating alarms on children (aggregation) or dependant objects (association). It will also include a priority attribute, which will indicate which rule should be used when an alarm can be correlated by two different alarms.
    A filter tag will specify a filter which will be evaluated when the alarm is created to determine whether the alarm is a correlating alarm or not.
    A "Can Suppress" tag will also be added to the alarm. This will indicate whether a specific alarm should be considered for suppression or not. When not specified, the default value will be yes.

Figure 3:
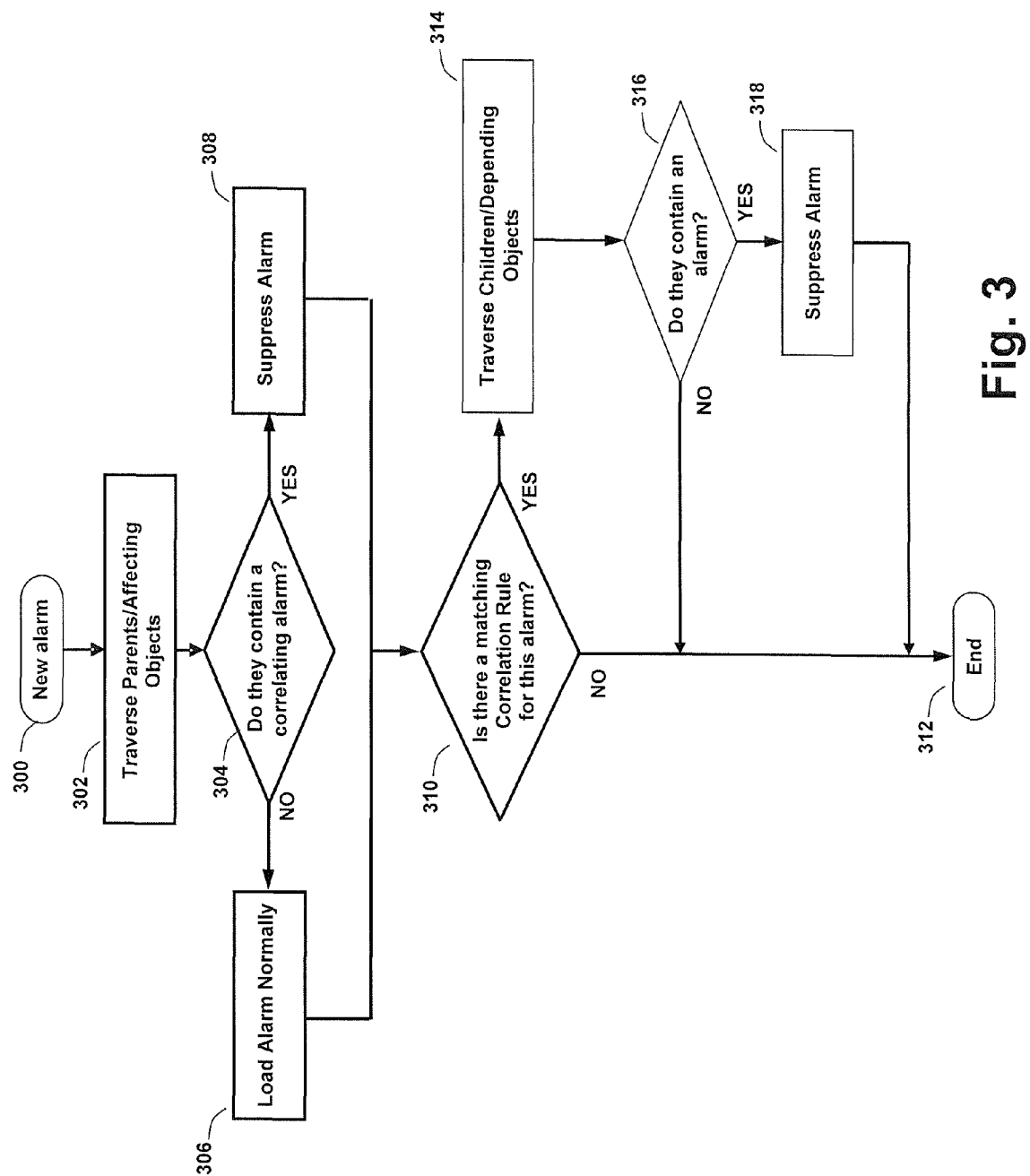
FIG. 3 illustrates a flowchart of a method for correlating alarms in accordance with an embodiment of the present invention.

Referring to FIG. 3 there may be seen a flowchart of a method for correlating alarms in accordance with an embodiment of the present invention. The method commences when a new alarm 300 is raised.

The next step 302 is to traverse the Parents/Affecting Objects for alarms. At step 304 a test is made as to whether the Parents/Affecting Objects contain a correlating alarm. If there is no correlating alarm, then control passes to step 306 and the alarm is loaded normally. If there is a correlating alarm, then control passes to step 308 and the alarm is determined to be a correlated alarm and is thereby suppressed.

In either case 306 or 308, control subsequently passes to step 310 where there is a test for a Correlation Rule for this alarm. If the answer is negative, then the alarm correlation process passes to 312 and Ends.

If the answer is positive, then there are Children/Depending Objects, and control passes to 314 where they are traversed. A check for whether they contain an alarm occurs at step 316, and if the answer is negative then the alarm correlation process passes to 312 and Ends.

If the answer is positive then there is a correlating alarm, at which point control passes to step 318 and the alarm is determined to be a correlated alarm and is thereby suppressed. This concludes the alarm correlation process and control subsequently passes to 312 and Ends.

Summarizing, alarms are correlated as they are loaded and created. Parents are first traversed to identify if they contain a correlating alarm under which the new alarm could be correlated. If such a correlating alarm is found, the alarm will be suppressed. If no such alarm is found, the affecting objects are traversed to identify correlating alarms, and suppress the alarm if found.

Then, the correlation rules will be scanned for one matching the alarm name, type, etc. If one is found the current alarm is handled as a correlating alarm. Its children and dependants are scanned to find alarms that can be correlated under the current alarm.

Traversing parent objects is the most straightforward traversal as each object has at most a single parent. The only conflict that arises is when a parent has several correlating alarms. Those conflicts are resolved by correlating under the alarm with the highest priority.

Figure 4:
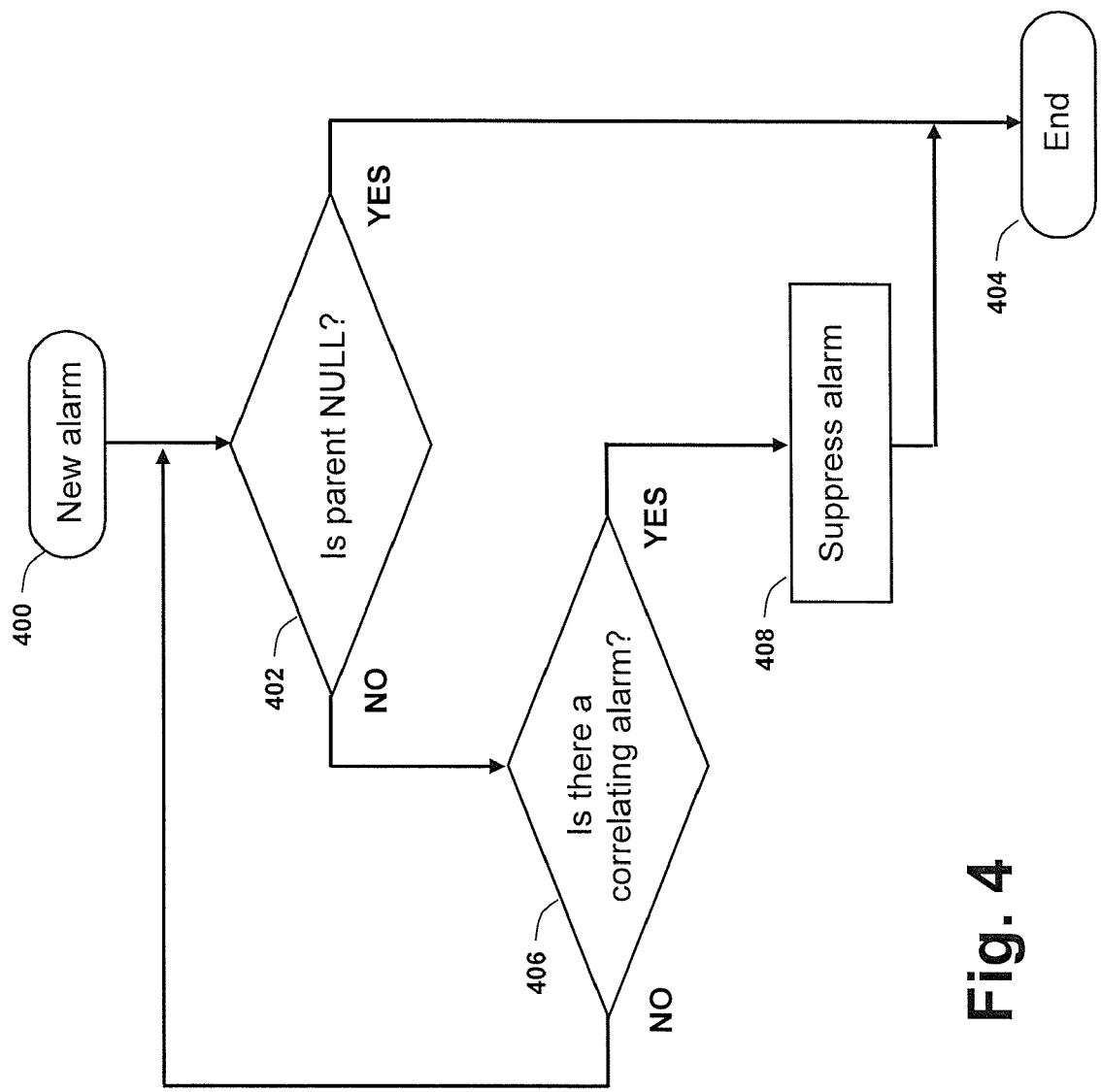
FIG. 4 illustrates a flowchart of a method for traversing parent objects in accordance with an embodiment of the present invention.

Referring to FIG. 4 there may be seen a flowchart of a method for traversing parent objects in accordance with an embodiment of the present invention. The method commences when a new alarm 400 is raised.

Control passes to step 402 wherein it is checked if the parent is NULL, i.e., no parent exists. If the check confirms that the parent is NULL, control passes to 404 and the process Ends.

If the check determines that the parent is not NULL, then control passes to step 406 wherein a check is made for the presence of a correlating alarm. If the check is affirmative, then the alarm is suppressed, control passes to 404, and the process Ends.

If the check does not determine the presence of a correlating alarm then control is routed back to step 402. This eventuality may occur when the new alarm being processed does not have a NULL parent, but the correlating alarm has not yet been processed.

Traversing affecting objects is more complex as is equates to traversing a graph. The method used is a depth-first search which stops searching a tree branch when one of the following conditions is met:

The current node is a leaf
The current node is the starting node (cycle)
The current node contains a correlating alarm If multiple correlating alarms are found, the one with the highest priority is selected.

In order to find alarms that should be correlated under the new alarm; a children traversal is required. This is facilitated by a naming convention which denotes children objects as having an portion of their names consisting of their parent's names. The search is then done by finding all alarmed objects' names which start with the current object's full name. Once again, this traversal is a depth-first one with the following conditions determining the tree leaves:

The current node has no children
The current node contains a correlating alarm

In order to find alarms that should be correlated under the new alarm; an affecting object traversal will be required. The affecting object list is already compiled to maintain each object's status. Once again, this traversal is a depth-first one with the following conditions determining the tree leaves:

The current node has no affected objects
The current node has been visited
The current node contains a correlating alarm Once correlated, the alarm is suppressed, while uncorrelated alarms will be unaffected. As a consequence suppressed alarms are no longer visible in the operator's Alarm Display window (unless the operator has elected to display correlated alarms).

When a correlating alarm is remedied, the correlated alarms should eventually be cleared since the root cause should be resolved. According to one embodiment, after a preset delay has expired alarms which are not cleared are un-correlated. These alarms are then processed as if they were being raised. As a consequence they may be correlated under a different alarm or simply shown as a normal alarm.

Accordingly, what has been disclosed is a method and process for correlating alarms raised on objects by specifying rules associating objects and alarms, and then processing alarms as they are raised so as to suppress correlated alarms. The net effect is that an equipment operator is presented with an error management display system capable of suppressing correlated alarms to simplify the presentation of alarm data, allowing the operator to see the alarms of importance, and facilitating the expeditious resolution of these alarms.

Note, in the preceding discussion a person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Numerous modifications, variations and adaptations may be made to the embodiment of the invention described above without departing from the scope of the invention, which is defined in the claims.

What is claimed is:

1. A method for managing alarms arising on a plurality of objects in telecommunications equipment, said method comprising:
    establishing a list of networked alarm relations among said plurality of objects, wherein said list of networked alarm relations specifies both correlated alarms and correlating alarms among said plurality of objects;
    establishing a list of correlating alarms;
    establishing a list of correlated alarms among child objects of parent objects in the list of correlating alarms, wherein a name of each correlated alarm comprises a name of a respective parent object; and, upon a new alarm being raised on an object of said plurality of objects,
    traversing said list of networked alarm relations in conjunction with said list of correlating alarms and said list of correlated alarms; and
    assigning said new alarm to either said list of correlating alarms or said list of correlated alarms.

2. The method as claimed in claim 1, wherein said traversing step comprises:
    traversing sets of parent objects, affecting objects, and children objects.

3. The method as claimed in claim 2, wherein said list of networked alarm relations among said plurality of objects further comprises a priority attribute.

4. The method as claimed in claim 3, further comprising:
    using said priority attribute in the assigning step in the event that said new alarm can be correlated by two different alarms.

5. The method as claimed in claim 1, further comprising:
    making said list of correlating alarms available to an operator as an alarm list with correlated alarms suppressed.

6. The method as claimed in claim 1, further comprising:
    making said list of correlated alarms available to an operator as an alarm list with correlated alarms un-suppressed.

7. The method as claimed in claim 1, wherein an object of said plurality of objects may comprise one of the set of a hardware device and a software function.

8. The method of claim 1, wherein alarm suppression hides the list of correlated alarms and only shows the list of correlating alarms.

9. The method of claim 1, wherein a correlation manager performs alarm correlation and manages display suppression.

10. The method of claim 9, wherein the correlation manager is implemented in hardware.

11. The method of claim 1, wherein there is a list of correlated alarms for each correlating alarm.

12. The method of claim 1, further comprising:
    performing, with a correlation manager, a recursive traversal of all alarms correlated under a specified alarm.

13. The method of claim 1, further comprising:
    indicating, with a correlation tag, a rule to be used when a specified alarm correlates to two different alarms.

14. The method of claim 1, further comprising:
    when multiple correlating alarms are found, selecting a particular alarm having a highest priority.

15. The method of claim 1, further comprising:
    displaying correlated alarms only after election by an operator.

16. A non-transitory article of manufacture for use in programming a telecommunications equipment to manage alarms arising on a plurality of objects in the telecommunications equipment, the non-transitory article of manufacture comprising computer useable media accessible to the telecommunications equipment, wherein the computer useable media includes at least one computer program that is capable of causing the telecommunications equipment to perform the steps of:

establishing a list of networked alarm relations among said plurality of objects, wherein said list of networked alarm relations specifies both correlated alarms and correlating alarms among said plurality of objects;

establishing a list of correlating alarms;

establishing a list of correlated alarms among child objects of parent objects in the list of correlating alarms, wherein a name of each correlated alarm comprises a name of a respective parent object; and, upon a new alarm being raised on an object of said plurality of objects, traversing said list of networked alarm relations in conjunction with said list of correlating alarms and said list of correlated alarms; and assigning said new alarm to one of either said list of correlating alarms or said list of correlated alarms.

17. The non-transitory article of manufacture as claimed in claim 16, wherein said traversing step further comprises:

traversing at least one of the set of parent objects, affecting objects, and children objects.

18. The non-transitory article of manufacture as claimed in claim 17, wherein said list of networked alarm relations among said plurality of objects further comprises a priority attribute.

19. The non-transitory article of manufacture as claimed in claim 18, wherein said priority attribute is used in the assigning step in the event that said new alarm can be correlated by two different alarms.

20. The non-transitory article of manufacture as claimed in claim 16, wherein an object of said plurality of objects may comprise one of the set of a hardware device and a software function.

* * * * *